Aug. 20, 1968  L. DELESCLUSE  3,397,591

SPEED-REDUCING GEAR TRANSMISSION

Filed March 29, 1967

INVENTOR.
LEON DELESCLUSE

BY *[signature]*

AGENT

United States Patent Office 3,397,591
Patented Aug. 20, 1968

3,397,591
SPEED-REDUCING GEAR TRANSMISSION
Leon Delescluse, Cysoing, France, assignor to Societe
Fives Lille-Cail, Paris, France
Filed Mar. 29, 1967, Ser. No. 626,808
Claims priority, application France, Mar. 30, 1966,
55,573
6 Claims. (Cl. 74—410)

ABSTRACT OF THE DISCLOSURE

A speed reducing transmission in which the output gear wheel is floatingly supported on two rollers symmetrically arranged relative to a vertical plane through the axis of the gear wheel, each roller being mounted on a carrier angularly movable on the gear box about an axis parallel to the axis of rotation of the gear wheel so that the weight of the gear wheel tends to pivot the carrier against the restraint of calibrated springs interposed between the gearbox and the carriers. The springs permit sufficient displacement of the gear wheel to distribute the driving torque equally on two pinions meshingly engaging the gear wheel in a symmetrical arrangement, and synchronously driven from a common input shaft through gearing and respective countershafts.

Background of the invention

This invention relates to gear transmissions, and particularly to speed reducing transmissions.

In its more specific aspects, the invention is concerned with a transmission suitable for turning a ball mill at the very slow speeds normally employed in such equipment, the necessary torque being supplied by a motor operating at much higher speed. Torque is transmitted from the input to the output shaft of the transmission by two countershafts synchronously driven by the input shaft, and by two pinions on the countershafts which simultaneously mesh with a gear wheel coupled to the output shaft, but floatingly supported in the transmission casing or gear box.

The invention is more specifically concerned with a suspension arrangement for the floating gear wheel which causes the driving torque to be evenly distributed to the countershafts regardless of imperfections in the gearing.

Summary of the invention

The invention provides two carriers mounted on the supporting structure of the transmission, such as a gearbox, which carry respective rollers normally symmetrically arranged relative to a vertical plane through the axis of rotation of the floating gear wheel. The rollers support the gear wheel while it is being driven by the afore-mentioned pinions.

The carriers are free to pivot on the supporting structure about axes of angular movement which are normally parallel to the axis of rotation of the floating gear wheel, and horizontally spaced from each other. The weight of the floating gear wheel tends to pivot the carriers about their axes of angular movement, and such pivotoing movement is opposed by a yieldably resilient device interposed between the supporting structure and each carrier.

The exact nature of the invention will become apparent to those skilled in the art in the following detailed description of a preferred embodiment of the invention illustrated in the accompanying drawing.

Description of the preferred embodiment

Figure 1:
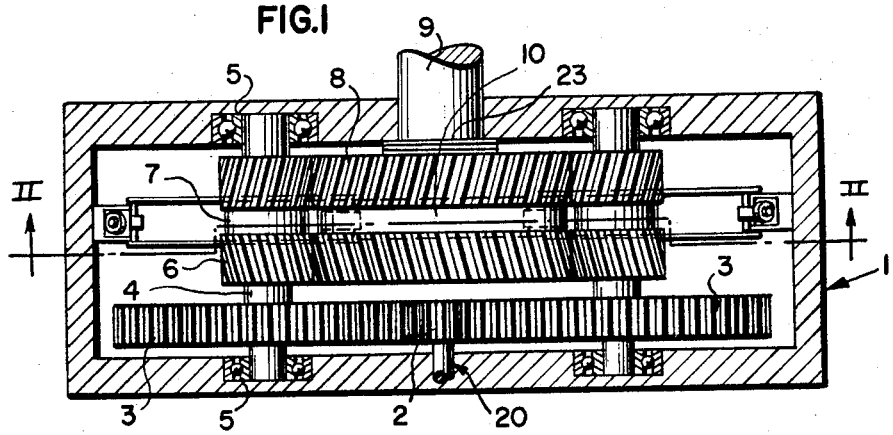
FIG. 1 shows a gear transmission of the invention in plan view, the cover of the transmission casing being removed.
Figure 2:
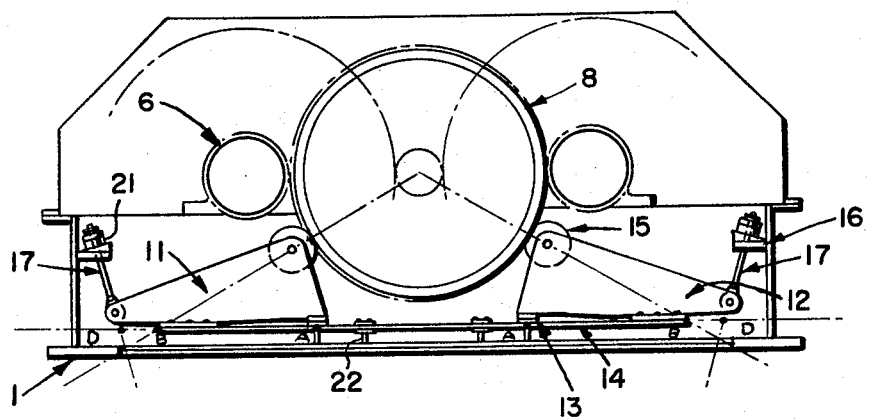
FIG. 2 shows the transmission of FIG. 1 in elevational section on the line II—II.
Figure 4:
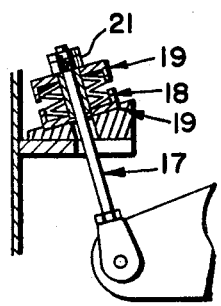
FIG. 4 shows a detail of FIG. 2 on a larger scale.

Refering now to the drawing in detail, and initially to FIGS. 1, 2 and 4, there is seen a casing or gear box 1 which encloses and supports the working elements of the illustrated speed reducing gear transmission. An input shaft 20 journaled in the casing 1 carries a pinion 2 which simultaneously meshes with two larger gears 3 on respective parallel countershafts 4 journaled in bearings 5 on the casing 1. Identical herringbone pinions 6 on the countershafts 4 mesh with a mating gear rim on a gear wheel 8. The axes of the countershafts 4 are parallel to each other and to the horizontal axis of the gear wheel 8 in the illustrated normal position of the latter.

The weight of the gear wheel 8 and of the attached output shaft 9 is supported practically exclusively on two rollers 15 which run in a smooth peripheral groove 10 cut into the gear face of the wheel 8 and aligned with corresponding grooves 7 of the pinions 6. The rollers are mounted on respective carriers 11, 12, the arrangement being symmetrical relative to a vertical plane through the axis of rotation of the gear wheel 8.

As viewed in side elevation in FIG. 2, each carrier 11, 12 is of triangular shape, the axis of rotation of the associated roller 15 being at the uppermost portion or apex, and the base being approximately horizontal. A bearing plate 13 at the end of each base near the other carrier rests freely on a portion of a flexible steel plate 14 which is connected to the bottom of the casing 1 by studs 22. The carriers are thus capable of pivoting movement about a horizontal axis defined by the line of contact between their bearing plates 13 and the plate 14 at A.

The other end of the base of each carrier 11, 12 is suspended from a bracket 16, welded to the casing 1, by a hingedly attached tie rod 17, best seen in FIG. 4, which is threaded and provided with a nut 21 at its upper end. A Belleville spring consisting of four stacked washers 18 and two cup shaped retaining washers 19 is interposed between the top of the bracket 16 and the nut 21 so that spring 18 opposes the pivotal movement of the associated carrier under the weight of the gear wheel 8, and angular movement of the carrier is limited by abutting engagement of the rims on the cup-shaped washers 19 when the spring 18 is being compressed.

Figure 3:
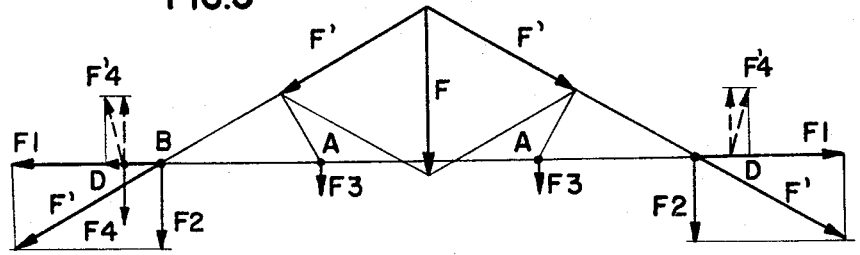
FIG. 3 is a vector diagram illustrating distribution of forces in the apparatus, as shown in FIG. 2.

The operational stresses normally prevailing in the afore-described apparatus are graphically represented in the vector diagram of FIG. 3. The weight F of the gear wheel 8 and of associated structure is transmitted in two normally identical components F' to the casing 1 by the carriers 11, 12. The position of each vector F' is defined by the axes of rotation of the gear wheel 8 and the rollers 15, and each vector line intersects a horizontal plane through the axes A of angular carrier movement at a point B. At B, the vectors F' have opposite horizontal components $F_1$ which cause tensile stresses in the plate 14 but cannot move the plate, and vertical components $F_2$ which are balanced by the vertical components of the restraining force of the associated springs 18 equal in magnitude and opposite in direction to the vector $F_4$, and to a minor extent by the resistance of the studs 22 which support the plate 14 at A and elsewhere, and which is opposite and equal to the vector $F_3$ in FIG. 3.

The rollers 15 are positioned in such a manner that the point of intersection B between each vector F' and the surface of support provided by the plate 14 is located between the point A in the surface of support about which the associated carrier pivots, and the point D of intersection between that surface and the vector $F'_4$ which represents the restraining force of the spring 18. In this position of the rollers 15, the gear wheel 8 is effectively centered in the plate of symmetry between the pinions 6 while the resilient support arrangement for the wheel 8 is subjected to relatively minor stresses. Careful selection and calibration of the two springs 18 is important. The useful life of the meshing gears is directly related to the balance of the two springs 18.

The normal position of the gear wheel 8 between the pinions 6 can be adjusted very precisely by turning the nuts 21 on the rods 18, and by locking the nuts in the adjusted position in a conventional manner. The springs 18 permit an adequate radial displacement of the wheel 8 from its normal position to compensate for minor imperfections in the gear teeth of the meshing elements without undue wear of the same. Unsymmetrical overloading of one of the countershafts 4 and of the gearing supported thereon is safely prevented.

It will be understood that the shaft 20 is normally connected to a relatively quickly rotating prime mover while the shaft 9 is connected to the afore-mentioned ball mill or any other apparatus that it is desired to drive at a speed much lower than that of the prime mover. A flexible coupling 23 connects the wheel 8 to the shaft 9 so as to permit the compensating radial movements of the wheel while the shaft 9 rotates about a fixed axis.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:
1. In a gear transmission, in combination:
   (a) a support;
   (b) two carrier means mounted on said support for angular movement about respective horizontally extending spaced axes;
   (c) a roller member mounted on each carrier means for rotation about a respective axis;
   (d) a floating gear wheel member supported on said roller members for rotation about an axis,
      (1) said axes of angular movement of said carrier means and said axis of rotation of said gear wheel member being substantially parallel,
      (2) said roller members being arranged substantially symmetrically with reference to a vertical plane through the axis of rotation of the gear wheel member and offset horizontally from the axes of angular movement of the associated carrier means,
      (3) whereby the wieght of the supported gear gear wheel tends angularly to move said carrier means in respective predetermined directions;
   (e) yieldably resilient means interposed between said support and each of said carrier means and opposing movement of said carrier means in said directions;
   (f) two pinion members rotatably mounted on said support substantially symmetrically relative to said vertical plane and meshing with said gear wheel member; and
   (g) drive means for synchronously driving said pinion members.

2. In a transmission as set forth in claim 1, said axes of angular movement defining a substantially horizontal plane, the axes of rotation of said gear wheel member and of each roller member defining a first vector line, and the opposing force of said yieldably resilient means acting on the carrier means associated with said roller member defining a second vector line, said lines intersecting said horizontal plane, the axis of angular movement of each carrier means and the point of intersection of the associated second vector line and of said horizontal plane being offset from the point of intersection of the associated first vector line with said horizontal plane in opposite directions.

3. In a transmission as set forth in claim 1, each carrier means being substantially triangular in elevational shape and having a horizontally extending base portion and an apex portion vertically offset from said base portion, the associated axis of angular movement being near one end of said base portion, and said yieldably resilient means engaging the other end of said base portion.

4. In a transmission as set forth in claim 3, said support including a flexible plate member, said one end of said base portion resting movably on said plate member.

5. In a transmission as set forth in claim 1, each yieldably resilient means including a spring mounted on said support, and an elongated tie member connecting said spring to the associated carrier means, one end portion of the tie member being fastened to said spring and the other end hingedly engaging said carrier means.

6. In a transmission as set forth in claim 1, abutment means limiting said angular movement of each carrier means.

References Cited
UNITED STATES PATENTS

| | | | |
|---|---|---|---|
| 2,884,287 | 4/1959 | Sommer | 74—410 X |
| 3,149,499 | 9/1964 | Schmitter | 74—410 X |
| 3,167,975 | 2/1965 | Durand | 74—410 X |
| 3,299,729 | 1/1967 | Durand | 74—410 X |
| 3,338,109 | 8/1967 | Forsyth et al. | 74—410 |

FRED C. MATTERN, JR., *Primary Examiner.*
LEONARD H. GERIN, *Assistant Examiner.*